(12) United States Patent
Carballo et al.

(10) Patent No.: US 7,133,654 B2
(45) Date of Patent: Nov. 7, 2006

(54) METHOD AND APPARATUS FOR MEASURING COMMUNICATIONS LINK QUALITY

(75) Inventors: Juan-Antonio Carballo, Austin, TX (US); Jeffrey L. Burns, Austin, TX (US); Ivan Vo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 10/636,992

(22) Filed: Aug. 7, 2003

(65) Prior Publication Data
US 2005/0032491 A1 Feb. 10, 2005

(51) Int. Cl.
*H04B 17/02* (2006.01)
(52) U.S. Cl. .................. 455/135; 455/161.3; 455/260; 375/371; 375/372; 377/39
(58) Field of Classification Search .......... 455/135, 455/161.3, 260; 375/371, 362, 372, 376; 377/39
See application file for complete search history.

(56) References Cited

U.S. PATENT DOCUMENTS

| | | | |
|---|---|---|---|
| 3,587,044 A | 6/1971 | Jenkins | |
| 3,676,583 A * | 7/1972 | Morita et al. ................. | 386/88 |
| 4,092,596 A | 5/1978 | Dickinson et al. | |
| 4,803,638 A | 2/1989 | Nottingham et al. | |
| 4,819,196 A | 4/1989 | Lilley | |
| 4,975,634 A | 12/1990 | Shohet | |
| 5,016,269 A | 5/1991 | Rogers | |
| 5,126,686 A | 6/1992 | Tam | |
| 5,220,678 A | 6/1993 | Feei | |
| 5,422,760 A | 6/1995 | Abbott et al. | |
| 5,481,563 A | 1/1996 | Hamre | |
| 5,872,810 A | 2/1999 | Philips et al. | |
| 5,880,837 A | 3/1999 | Robert | |
| 5,912,920 A | 6/1999 | Marchok | |
| 5,982,833 A * | 11/1999 | Waters ........................ | 375/372 |
| 6,134,214 A | 10/2000 | Takagi et al. | |
| 6,178,215 B1 * | 1/2001 | Zhang et al. ............... | 375/371 |
| 6,282,045 B1 | 8/2001 | Glover | |
| 6,295,315 B1 | 9/2001 | Frish et al. | |
| 6,304,615 B1 | 10/2001 | Webster | |

(Continued)

OTHER PUBLICATIONS

Dalal and Rosenthal; International Test Conference Proceedings, Oct. 18-23, 1998; pp. 814-818.

(Continued)

*Primary Examiner*—Matthew D. Anderson
*Assistant Examiner*—Sanh Phu
(74) *Attorney, Agent, or Firm*—Mitch Harris, Atty at Law, LLC; Andrew M. Harris; Casimer K. Salys

(57) ABSTRACT

A method and apparatus for measuring communications link quality provides accurate on-chip estimation of the difficulty of achieving a particular bit error rate (BER) for a communications link. A low cost/complexity accumulator circuit connected to internal signals from a clock/data recovery (CDR) circuit provides a measure of high frequency and low frequency jitter in a received signal. The low frequency jitter measurement is used to correct the high frequency jitter measurement which may otherwise contain error. The corrected output may be used to adjust operational characteristics of the link or otherwise evaluate the link for operating margin. The correction may be performed by subtracting a portion of the low frequency jitter measurement from the measured high frequency jitter, or the value of the low frequency jitter measurement may be used to select between two or more correction factors that are then applied to the high frequency jitter measurement.

13 Claims, 7 Drawing Sheets

U.S. PATENT DOCUMENTS

| | | |
|---|---|---|
| 6,377,076 B1 | 4/2002 | Gauthier |
| 6,549,604 B1 * | 4/2003 | Shenoi ........................ 377/39 |
| 6,580,930 B1 | 6/2003 | Fulghum et al. |
| 6,810,216 B1 | 10/2004 | Tourunen |
| 2003/0062926 A1 | 4/2003 | Wilcox et al. |
| 2004/0051555 A1 | 3/2004 | Wilcox et al. |
| 2004/0257114 A1 | 12/2004 | Hanneberg et al. |

OTHER PUBLICATIONS

Dwivedi, et al., "Traffic Model for USA Long-distance Optical Network", Optical Fiber Communication Conference, 2000, vol. 1, pp. 156-158.

Mehta, et al., "Fixed Sensor Networks for Civil Infrastructure Monitoring—An Initial Study", Dept. of ICS, UC Irvine, Aug. 2002.

* cited by examiner

METHOD AND APPARATUS FOR MEASURING COMMUNICATIONS LINK QUALITY

CROSS-REFERENCE TO RELATED APPLICATIONS

The present application is related to U.S. patent applications entitled "INTERFACE TRANSCEIVER POWER MANAGEMENT METHOD AND APPARATUS" Ser. No. 10/289,777 filed on Nov. 7, 2002, and "INTERFACE TRANSCEIVER POWER MANAGEMENT METHOD AND APPARATUS INCLUDING CONTROLLED CIRCUIT COMPLEXITY AND POWER SUPPLY VOLTAGE" Ser. No. 10/302,494 filed on Nov. 21, 2002, having at least one common inventor and assigned to the same assignee. The specifications of the above-referenced patent applications are incorporated herein by reference.

BACKGROUND OF THE INVENTION

1. Technical Field

The present invention relates generally to communication link circuits, and more particularly, to communications link quality measurement circuits.

2. Description of the Related Art

Interfaces between present-day system devices and also between circuits have increased in operating frequency and complexity. In particular, high speed serial interfaces employ sophisticated clock-and-data-recovery (CDR) receiver techniques including data/clock extraction, jitter reduction via feed-forward and feedback circuits, phase correction, error correction, error recovery circuits and equalization circuits in order to improve performance.

Channel quality and bit error rate (BER) requirements of a given interface determine the "difficulty" of the interface in terms of receiver signal processing requirements and power/voltage requirements, transmitter power levels and overall interface architecture. Generally, especially in an integrated circuit (IC) implementation, a wide margin is provided to meet various customer and channel requirements, yielding a less than optimal design from a power/complexity design point. The above-incorporated patent applications describe techniques for adapting interface circuits in order to reduce complexity and power requirements. However, it is necessary to measure interface signal quality in order to adapt an interface dynamically to channel and application conditions. Even with statically selectable interface complexity and power/voltage levels, in order to know the confidence level of an interface, testing is required.

Measurements of interface quality are typically performed by phase margin measurements, e.g., a receiver eye diagram measurement that provides a measure of the performance of the interface on a given physical channel. Other techniques include measuring loop error parameters of a PLL (phase-lock-loop) or DLL (delay-locked loop) in order to determine the level of jitter present at the receiver.

However, the interface may not already include a DLL or PLL circuit adaptable for measuring loop error parameters as part of the design, and such circuits are costly additions to a system (e.g., such circuits have high area and power requirements) and are inherently mixed-signal circuits that are difficult to design and implement. Further, other measurement circuits such as eye diagram measurements are also costly to implement. The above techniques are also not always indicative of true channel quality, as depending on interface design, decrease in eye width or increase in PLL/DLL error signal amplitude may not accurately indicate the resulting channel quality.

It is therefore desirable to provide a method and apparatus for measuring interface quality that provides an accurate estimate of the difficulty of achieving a particular level of interface BER performance. It would further be desirable to provide a method and apparatus for measuring interface quality that have low incremental cost for addition to an integrated circuit having CDR receiver circuitry.

SUMMARY OF THE INVENTION

The above-stated objectives of providing a low-cost interface quality measurement circuit that produces an accurate estimate of the difficulty of meeting a particular level of BER performance is achieved in a method and apparatus.

The method is embodied in the operation of the apparatus, which includes a first circuit for estimating high frequency jitter in an input signal. The apparatus also includes a second circuit for estimating low frequency jitter in the input signal and a correction circuit for correcting the output of the first circuit in conformity with the output of the second circuit. The correction circuit removes contributions of low frequency jitter from the high frequency jitter measurement, so that an accurate estimate of channel effects on BER is achieved. The first and second circuit may use existing signals within a CDR circuit and may be simple "accumulators" providing a low-cost measurement to interfaces having a CDR front end. The correction circuit may combine the high and low frequency measurements to provide a corrected output, or the low frequency jitter measurement may be used to determine an adjustment to be applied to the high frequency jitter measurement.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns link quality measurement and techniques for evaluating the difficulty of a communications link design. Since bit error rate (BER) and channel conditions control the design requirements for a particular link, a measurement of actual link quality yields a tool for evaluating the link difficulty, which is a function of BER requirements and channel conditions. The present invention provides novel measurement circuits and methods for evaluating link performance and optionally controlling receiver and/or transmitter characteristics in response to the measured channel quality. The techniques of the present invention provide a mechanism for differentiating between interface requirement components such as frequency offset and signal to noise ratios by providing a direct measure of high frequency jitter, low frequency jitter and the impact of jitter on BER. The measurement circuits have low incremental cost, especially when integrated within an on-chip receiver having a clock/data recovery (CDR) circuit, as the measurement circuit can leverage existing circuitry to provide the measurement input, thereby requiring only the addition of simple digital circuits. The measurement circuitry can be used to dynamically control receiver and/or transmitter circuitry to meet link requirements, can be used at start-up to determine requirements, or may be used only for evaluation of a link design or monitoring. The above-incorporated patent application "INTERFACE TRANSCEIVER POWER MANAGEMENT METHOD AND APPARATUS INCLUDING CONTROLLED CIRCUIT COMPLEXITY AND POWER SUPPLY VOLTAGE" describes a system having dynamic and/or static control of receiver and/or transmitter parameters and the illustrations provided below depict modifications and implementations of the transceivers described in the above-referenced patent application that incorporate circuits and methods in accordance with embodiments of the present invention in order to illustrate an application. It should be understood, however, that the measurement techniques and apparatus of the present invention may be applied to other transceivers or receivers, including analog communications links where the edge detection described should be understood to apply to an equivalent detection such as zero-crossing detection.

Figure 1:
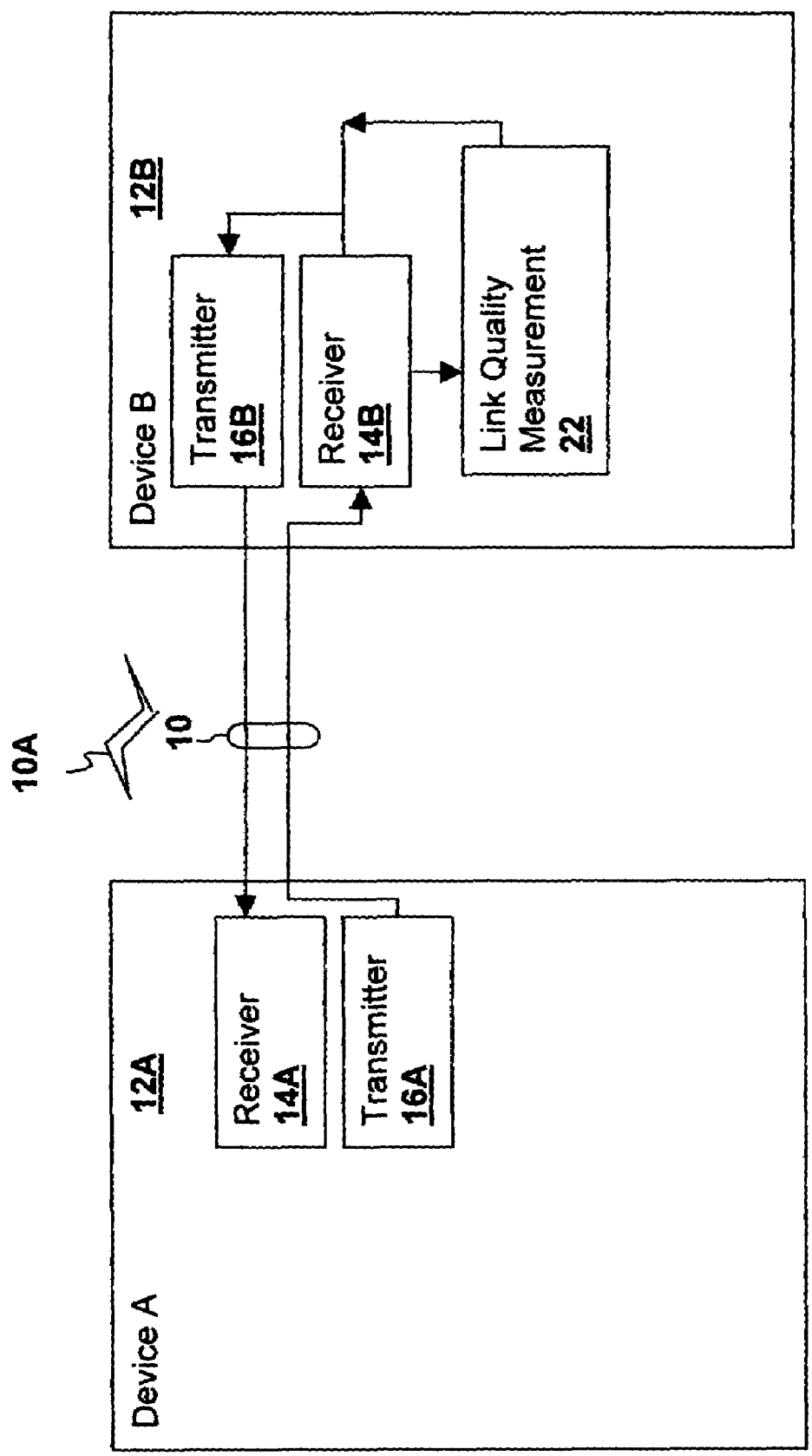
FIG. 1 is a block diagram of transceivers connected by an interface in accordance with an embodiment of the invention.

With reference now to the figures, and in particular with reference to FIG. 1, there is depicted a block diagram of transceivers 12A and 12B connected by an interface or channel 10 in accordance with an embodiment of the invention. The communications link of FIG. 1 is a link similar to that depicted in the above-referenced patent application, but includes a link quality measurement circuit 22 coupled to a receiver 14B for receiving internal signals of receiver 14B and determining link quality from jitter measurements for a signal received by receiver 14B.

Transceivers 12A, 12B may be located within a device such as a computer peripheral, a computer system, or within integrated circuits interconnected within a system. Interface 10 may be a single two wire bi-directional interface as depicted, or may be a full-duplex single wire interface or a bus having multiple transceivers in a half-duplex or full-duplex configuration. Alternatively, the connection may be a wireless connection 10A coupling transceivers 12A and 12B.

Transceivers 12A and 12B connected to interface 10 (or alternatively coupled via wireless connection 10A) each using a receiver 14A and 14B and a transmitter 16A and 16B, but the present invention is applicable to receivers in general and it should be understood that a receiver in accordance with an embodiment of the invention may be incorporated in devices for connection to any of the above-specified types of interface 10, as well as other forms of electrical signal interconnection. Additionally, the techniques of the present invention are applicable to wireless connections such as those connecting digital radios and wireless local area network (WLAN) devices that generally incorporate digital signal processing blocks as part of the receiver.

Transceivers 12A and 12B may include the selection of power consumption states described in the above-referenced patent application, but the present invention is directed toward the structure and methods embodied in link quality measurement block 22. Transceiver 12B is an example of a transceiver having automatic link-quality-based complexity selection and supply voltage level in response to a measurement performed by link quality measurement block 22, which measures jitter providing detection that the channel quality is less than a desired threshold. Link quality measurement block 22 is coupled to receiver 14B and transmitter 16B to automatically select higher or lower receiver and/or transmitter complexity in conformity with the measured channel quality. Also, the operating voltage level of the receiver 14B and transmitter 16B blocks may also be adjusted for circuit blocks that can operate at a lower voltage level when complexity is reduced. Information may also be transmitted from transceiver 12B to transceiver 12A to control transceiver 12A power consumption via reception of a command code sent over interface 10 or 10A and received by a receiver 14A. The interface link control is very useful where the receiver and transmitter characteristics must match (such as when the link quality measurement block 22 changes an error-correction length or when matching filters are used at each end of interface 10 or 10A). Interface link control is also useful for informing transceiver 12A about link conditions when transceiver 12A has no ability to determine the channel quality or does not have information regarding channel conditions (such as cable length).

Figure 2:
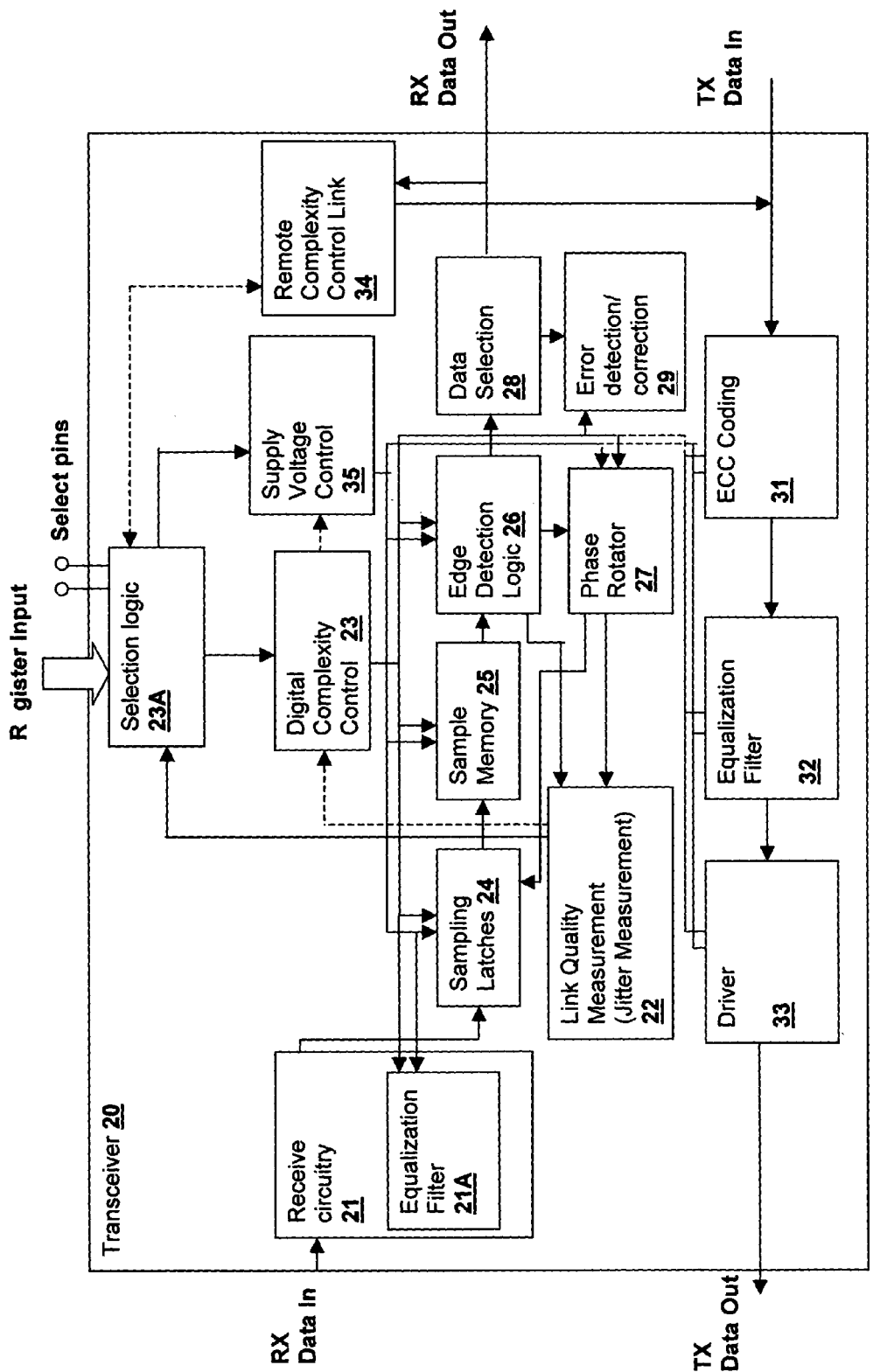
FIG. 2 is a block diagram of a transceiver in accordance with an embodiment of the invention.

Referring now to FIG. 2, details of a transceiver 20 in accordance with an embodiment of the invention are depicted. An interface signal is received at RX Data In and provided to a receiver circuit 21 that may contain an equalization filter 21A or may not. The output of receiver circuit 21 is generally presented to a series of sampling latches 24 and data is provided from sample latches 24 to a sample memory 25. Sampling latches 24 and sample memory 25 are used to "oversample" the received signal so that the edges of the signal can be determined with more accuracy in the face of high frequency jitter.

Edge detection logic 26 detects one or both edges of the received signal and provides early/late information to phase rotator 27, which in turn controls sampling latches 24 to compensate for low-frequency jitter. Data is extracted by data selection 28 and error detection and correction circuits 29 may be employed to further minimize the bit error rate (BER) of the received signal.

A digital complexity control circuit 23 provides one or more control signals to various of the above-described blocks to select a higher or lower power consumption depending on the channel requirements. A control interface 23A may also be coupled to digital complexity control 23 and link quality measurement block 22 to provide a programmable register input interface or to accept state programming from external select pins and to provide an output by which an external device may read the results of a link quality measurement. The selection input to selection logic 23A and digital complexity control 23 may be static or static/programmable, or dynamic based upon an output of link quality measurement block 22.

The power consumption of the various circuits is tailored by reducing the overall complexity or direct power levels used by the circuits and may be controlled by individual control bits or a single control bit. For example, the number of sampling latches 24 employed is proportional to the power consumption of the sampling 24 latches block, the size of sample memory 25, the resolution of the phase control circuit 27 and edge detection logic 26, and the depth of error correction and detection 29 are all proportional to their power consumption. Any or all of the above-listed circuit blocks may have selectable power consumption and may be controlled independently or together at one or more power consumption levels.

A supply voltage control circuit 35 is also coupled to selection logic 23A and also optionally or alternatively coupled to digital complexity control 23. Supply voltage control circuit 35 adjusts power supplies (including transistor body bias voltages) of one or more internal circuit blocks for which complexity is adjusted as described above. Once a lowered complexity is selected to achieve the performance requirements for the particular application and/or channel condition, the power supplies of one or more of the circuit blocks connected to supply voltage control may be lowered to a new minimum operating voltage level (or higher level as dictated by design margins), which can be achieved by direct programming of selection logic 23A or by signals derived from digital complexity control 23 based on the selection of complexity. A more general embodiment includes a single control block that performs computation of an optimal complexity/voltage level combination, either simultaneously or sequentially in either order. For example, an operating voltage level may be set and supportable circuit complexity then selected in conformity with the preset operating voltage level.

The transmitter portion of transceiver 20 comprises an optional error correction coding circuit 31, an optional equalization filter 32 and a driver 33 for transmitting data on the interface TX Data Out. Digital complexity control 23 may also control the complexity of the transmitter circuits, such as driver 33 current, equalization filter 32 length or ECC coding 31 depth. Supply voltage control 35 is also coupled to transmitter circuit processing blocks 31–33, so that the power supply voltages may be lowered if performance requirements may be met at a lowered supply voltage level.

Selection logic 23A is also shown coupled to an optional remote complexity control link 34 for controlling power consumption. (Alternatively remote complexity control link 34 may be coupled directly to digital complexity control 23 and/or supply voltage control 35.) A command received at RX Data In can be received and decoded to control the complexity and operating voltage levels of the circuit blocks within transceiver 20 via the output of data selection 28. Remote complexity control link 34 is also shown coupled to the transmitter circuits for transmitting complexity control/voltage control information to a remote transceiver. These remote control features are optional and their implementation depends on whether it is possible and desirable to send and receive control information over the interface channel.

Figure 3:
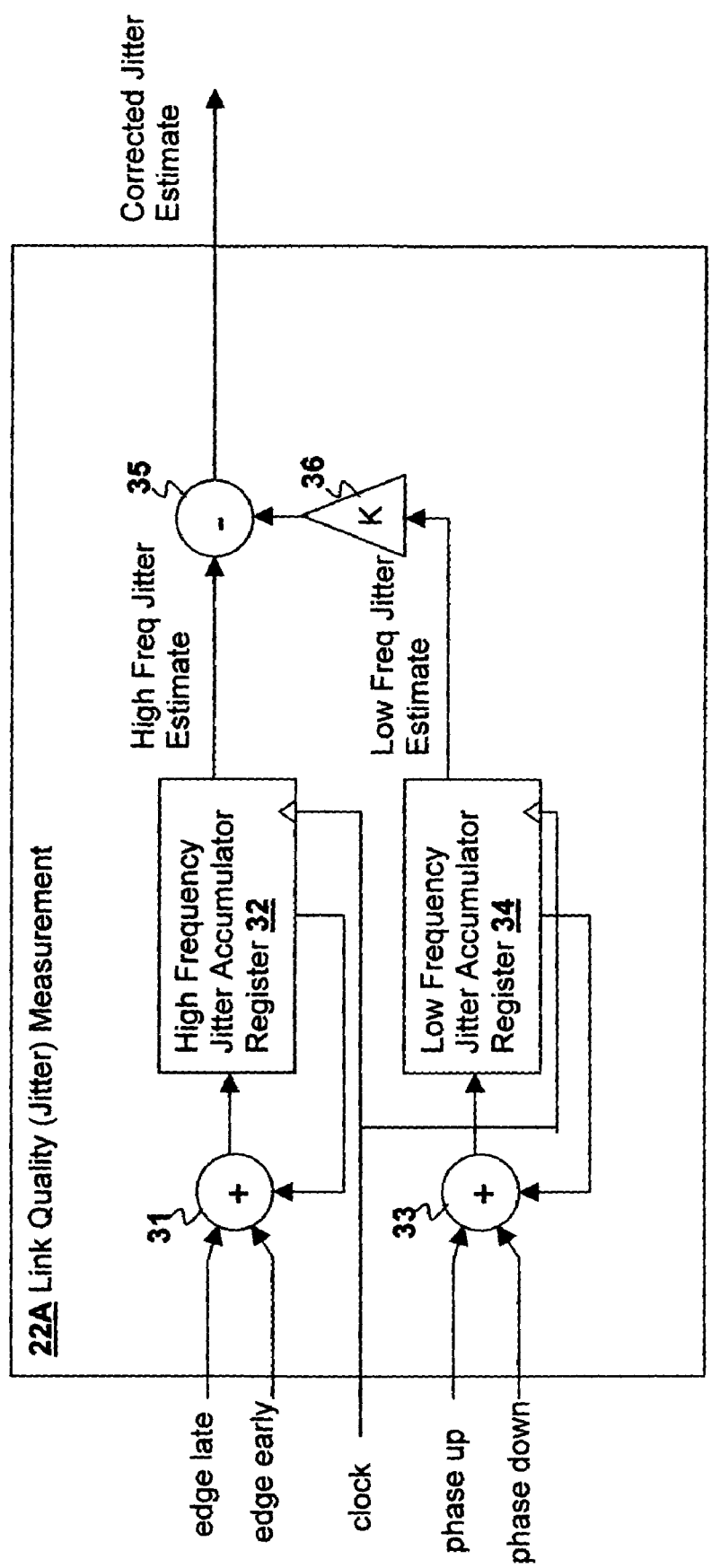
FIG. 3 is a schematic diagram of a link quality measurement circuit in accordance with an embodiment of the invention.

Referring now to FIG. 3, details of a link quality measurement block 22A in accordance with an embodiment of the present invention are illustrated. A high frequency jitter accumulator register 32 accumulates a sum of edge early and edge late signals provided to summing combiner 31 from internal circuits of a receiver, generally from edge detection logic 26 of FIG. 2. High frequency jitter accumulator register 32 accumulates edge detection signals over a large number of received bits, generally 10,000–70,000 bits per measurement, providing a count that is a statistical representation of the total high frequency jitter present in the signal received by receiver 14B of FIG. 1. High frequency jitter accumulator register 32 is periodically reset after the predetermined number of samples has been accumulated and the count evaluated. While high frequency jitter accumulator register 32 provides a measure of high frequency jitter, the total count also contains a contribution from low frequency jitter, which is generally due to frequency offset between the local clock (reference clock) in receiver 14B and the reference clock in the transmitting unit. Therefore, in order to provide a high frequency jitter measurement that accurately represents actual link degradation, low-frequency jitter contributions to the totals accumulated by high frequency jitter accumulator register 32 must be removed or otherwise compensated for.

A low frequency jitter accumulator register 34 accumulates a sum of phase up and phase down (correction) signals provided to summing combiner 33 from internal circuits of a receiver, generally from control logic within phase rotator block 27 of FIG. 2, which generally includes a state machine controlling a phase rotator. Low frequency jitter accumulator register 34 accumulates a large number of phase correction signals, generally requiring less count cycles than for the high frequency jitter count, but for convenience counts between 10,000 and 70,000 bits per measurement equal to the high frequency count amount have been used. The accumulation provides a count that is a statistical representation of the total low frequency jitter present in the signal received by receiver 14B of FIG. 1. Low frequency jitter accumulator register 34 is periodically reset after the predetermined number of samples has been accumulated and the count evaluated. The low-frequency and the high-frequency jitter indicators can also provide other statistical measures if appropriate, such as a standard deviation and mean value of the jitter. The indicator circuits can achieve longer-term statistics, for example by averaging the count for a given period with the count from the previous period, instead of resetting the count values periodically.

A correction circuit comprising a subtractor 35 and scalor 36 remove a predetermined fraction of the low frequency jitter estimate provided by low frequency jitter accumulation register 34, to provide a corrected high frequency jitter estimate at the output of link quality measurement block 22A. Generally, for equal count depths, a factor of 0.5 of the low frequency jitter measurement subtracted from the high frequency jitter count provides adequate correction, but the factor is generally determined via simulation or hardware calibration of an interface.

Figure 4:
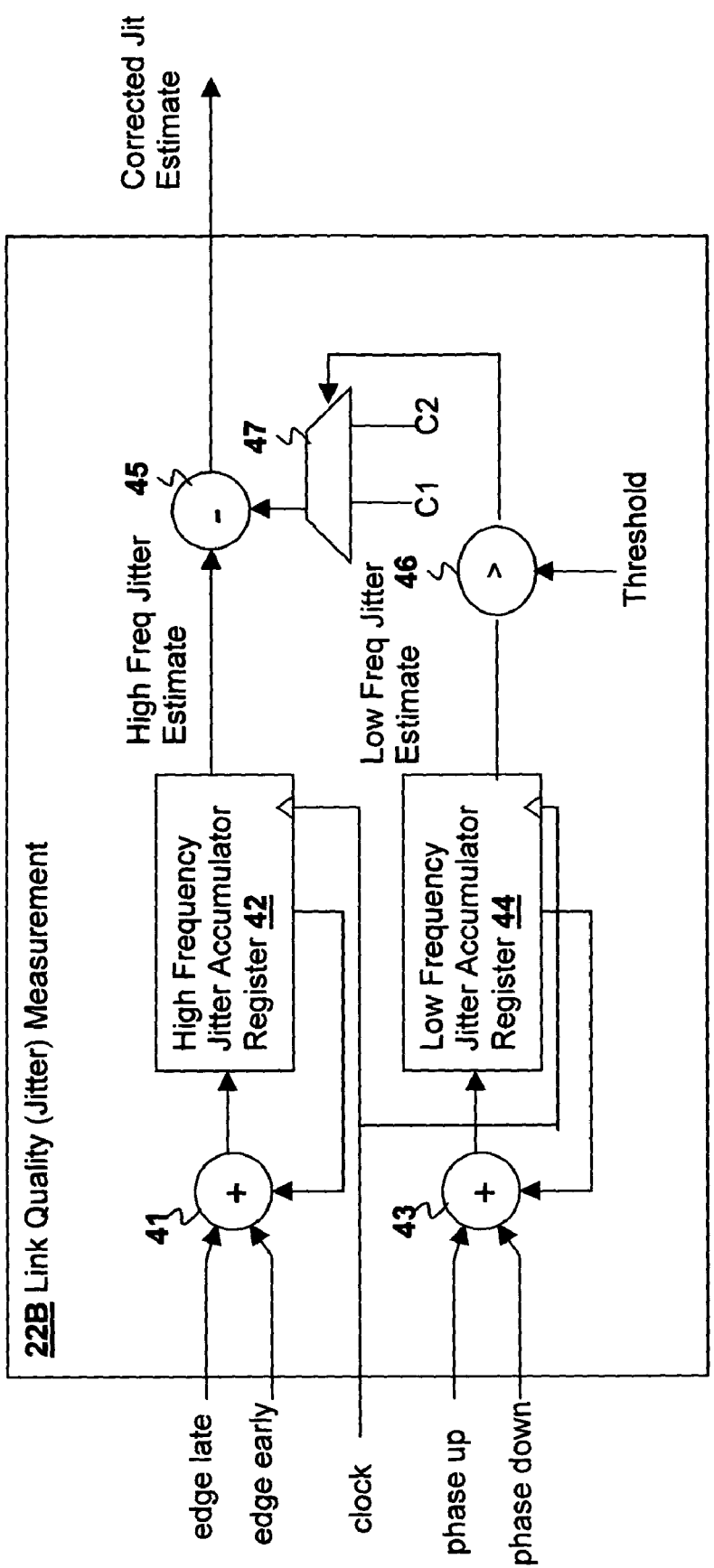
FIG. 4 is a schematic diagram of a link quality measurement circuit in accordance with another embodiment of the invention.

An alternative link quality measurement block 22B in accordance with another embodiment of the present invention is depicted in FIG. 4. Elements common to FIGS. 3 and 4 will be understood to operate in a like manner, so only differences between the figures shall be described. Rather than subtracting a fraction of the low frequency jitter measurement from the high frequency jitter measurement, in link quality measurement block 22B the correction circuit subtracts a constant value C1 or C2 from the high frequency jitter measurement to provide the corrected jitter estimate. The above operation is accomplished by subtractor 45 and the constant value is provided through a selector 45, which selects between two or more constant values (generally the value for low levels of low frequency jitter will be zero and the count for high levels of low frequency jitter will be approximately half of the typical, high frequency jitter count). The subtraction reduces the high frequency jitter estimate when the low frequency jitter is above a threshold determined by a threshold detector 46, which may be a detector having multiple thresholds and multiple outputs connected to selection inputs of selector 47 for selecting among multiple constants for correcting the high frequency jitter estimate. The above-described embodiment is most useful when there are several known channel or application types for which the measurements are performed.

Figure 5:
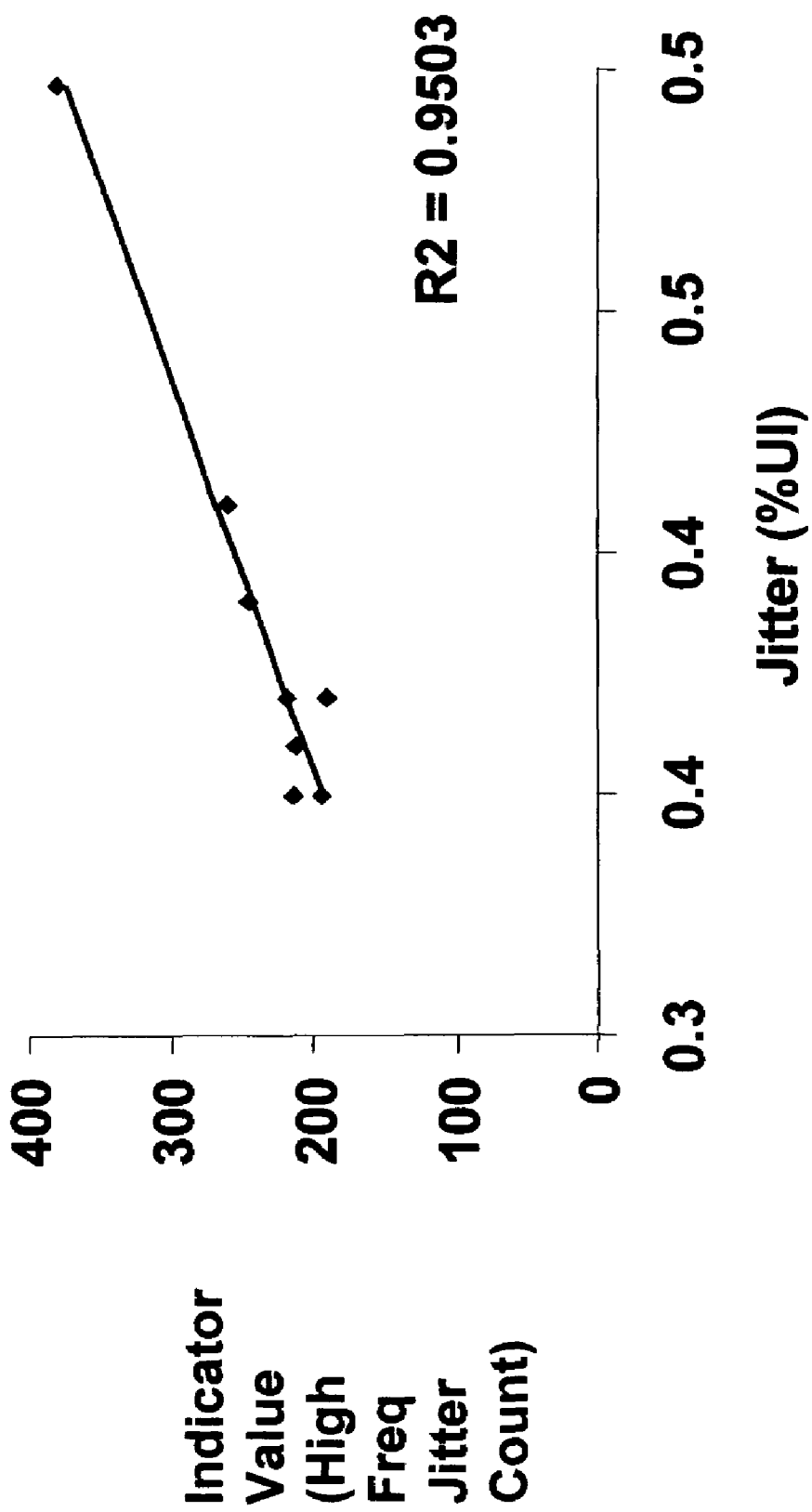
FIG. 5 is a graph depicting correlation of high frequency jitter to the high frequency jitter measurement of the present invention.

Referring now to FIG. 5, a graph depicting correlation between count values of the corrected high frequency jitter measurement of the present invention versus actual channel-induced jitter percentages is shown. The correlation coefficient of the linear estimate is 0.9503, showing a very linear relationship of the measurement count values to actual jitter present in several actual link implementations.

Figure 6:
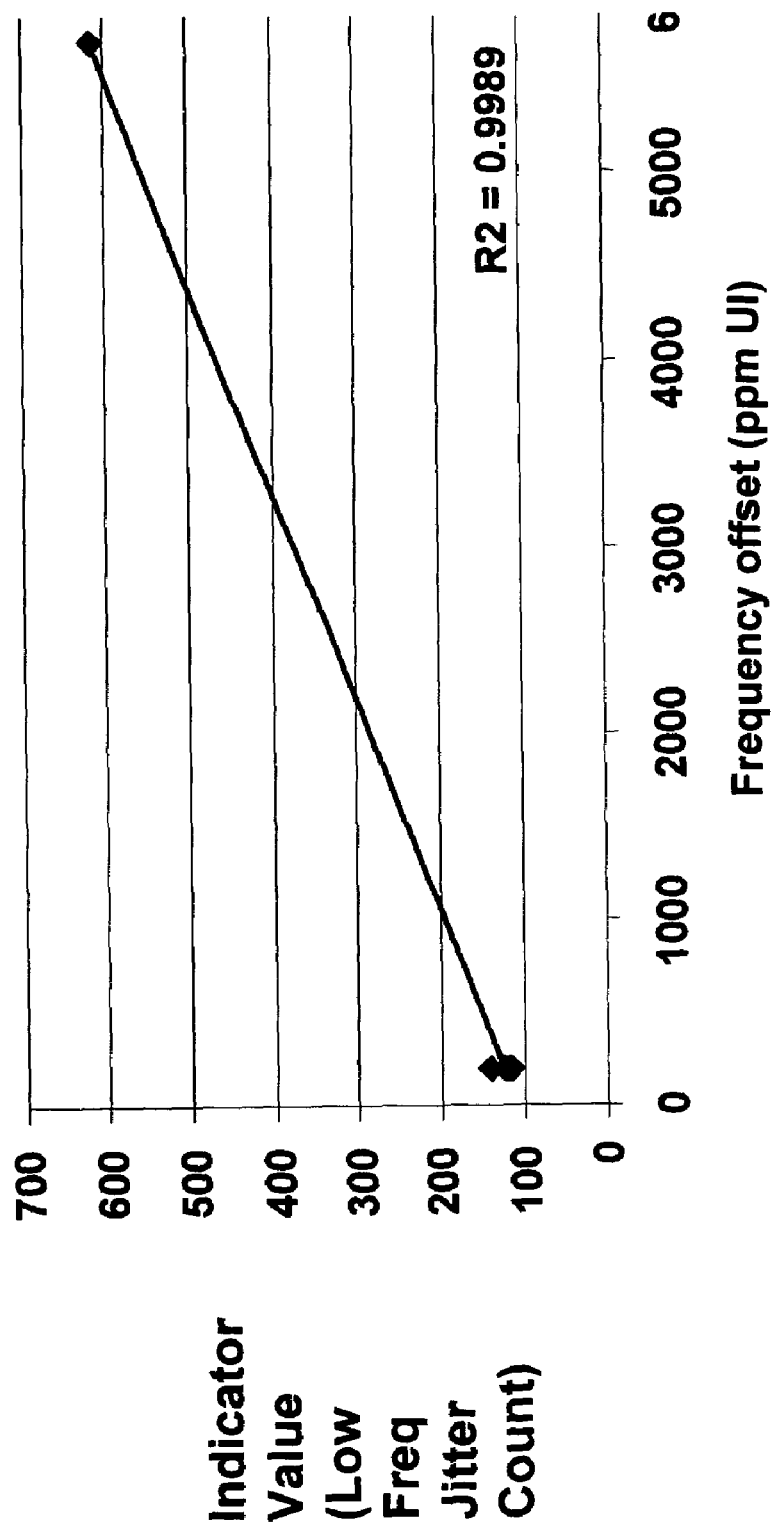
FIG. 6 is a graph depicting correlation of maximum frequency offset to the low frequency jitter measurement of the present invention.

Referring now to FIG. 6, a graph depicting correlation between count values of the low frequency jitter measurement of the present invention versus maximum frequency offset between the transmitter and receiver clocks is shown. The correlation coefficient of the linear estimate is 0.9989, showing a very linear relationship of the measurement count values to actual low frequency jitter due to frequency offset present in several actual link implementations. Further simulations have been performed that verify the linearity over the entire range of count values.

Figure 7:
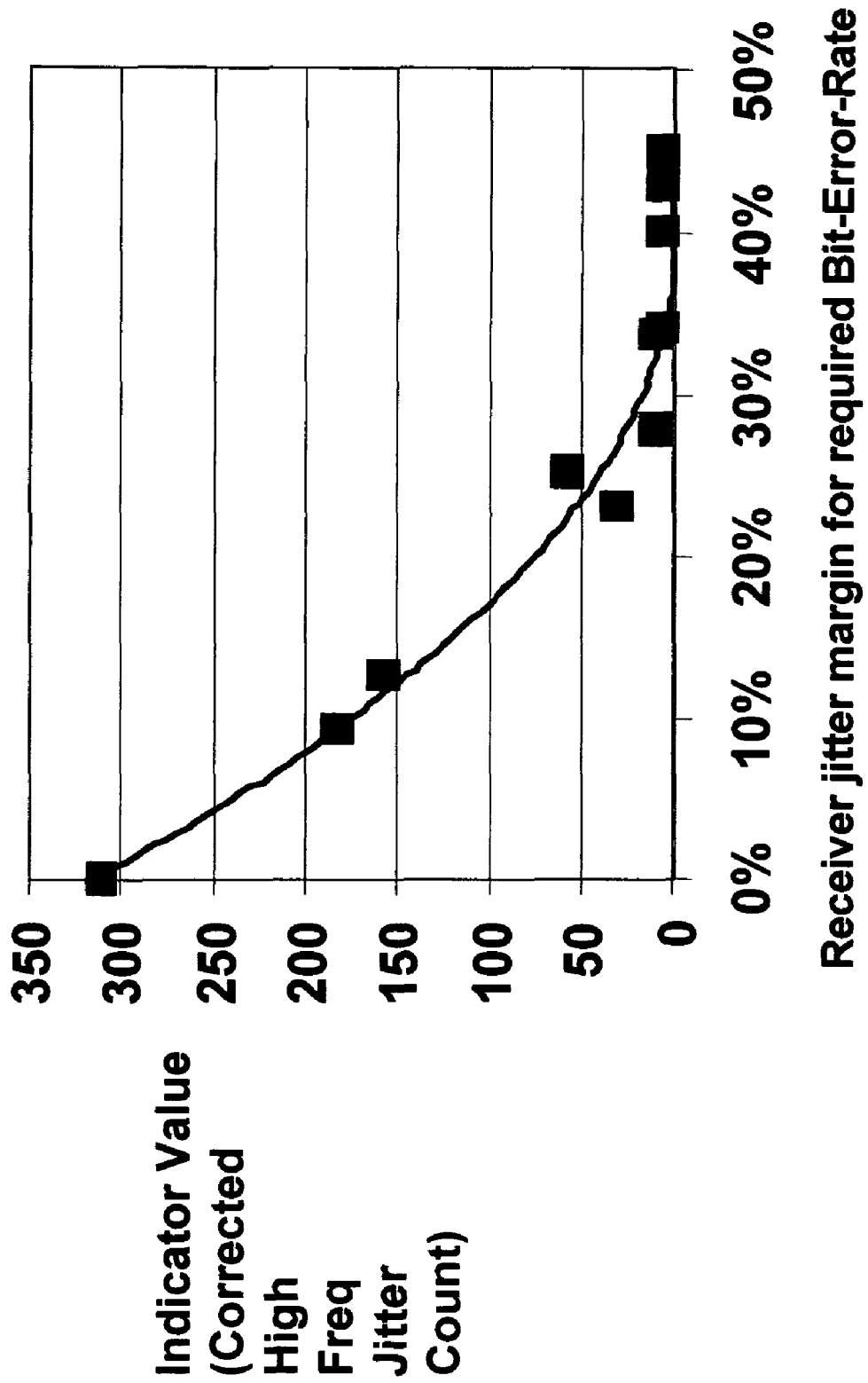
FIG. 7 is a graph depicting the relationship between jitter margin for fixed BER and the corrected jitter measurement of the present invention.

Referring now to FIG. 7, a graph depicting the relationship of corrected high frequency jitter count values in the measurement of the present invention versus receiver jitter margin for a predetermined BER is shown for several actual links. For jitter margins less than 30%, the shape of the curve shows that a linear estimate of jitter margin will reasonably match the actual jitter margin. For jitter margins greater than 30%, the link is generally of such high quality that very few receiver deviations are measured (e.g., the received signal edges are generally within the detection limits of the edge detector circuit and therefore the count value drops dramatically near zero for high channel quality links).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A communications link receiver, comprising:
a data receiver for receiving a communications signal from a communications link;
a first circuit for producing a high frequency jitter measurement output proportional to an amount of high frequency jitter of said communications signal, said high frequency jitter measurement output having a component that varies with an amount of low frequency jitter present in said communications signal;
a second circuit for producing a low frequency jitter measurement output proportional to an amount of low frequency jitter of said communications signal; and
a correction circuit coupled to said high frequency jitter measurement output and said low frequency jitter measurement output for correcting said high frequency jitter measurement output in conformity with said low frequency jitter measurement output to produce a corrected high frequency jitter measurement output, wherein said data receiver comprises a clock/data recovery circuit, and wherein an input of said first circuit and an input of said second circuit are coupled internal signals of said clock and data recovery circuit for providing a measure of jitter of said communications signal.

2. The communications link receiver of claim 1, wherein said first circuit is coupled to one or more internal digital signals from said clock/data recovery circuit providing indications of edge positions of said communications signal with respect to a reference clock of said clock/data recovery circuit.

3. The communications link receiver of claim 2, wherein said first circuit includes an accumulator that accumulates said indications of edge positions, providing a statistical average of deviations of said edge positions of said communications signal from edge positions of said reference clock.

4. The communications link receiver of claim 1, wherein said second circuit is coupled to one or more internal digital signals from said clock/data recovery circuit providing indications of long-term phase variation of said communications signal with respect to a reference clock of said clock/data recovery circuit.

5. The communications link receiver of claim 4, wherein said second circuit includes an accumulator that accumulates said indications of long-term phase variation, thereby providing a statistical average of said long-term phase variation.

6. A communications link receiver, comprising:
a data receiver for receiving a communications signal from a communications link;
a first circuit for producing a high frequency jitter measurement output proportional to an amount of high frequency jitter of said communications signal, said high frequency jitter measurement output having a component that varies with an amount of low frequency jitter present in said communications signal;
a second circuit for producing a low frequency jitter measurement output proportional to an amount of low frequency jitter of said communications signal; and
a correction circuit coupled to said high frequency jitter measurement output and said low frequency jitter measurement output for correcting said high frequency jitter measurement output in conformity with said low frequency jitter measurement output to produce a corrected high frequency jitter measurement output, wherein said correction circuit subtracts a predetermined portion of said low frequency jitter measurement output from said high frequency jitter measurement output to produce said corrected high frequency jitter measurement output.

7. A communications link receiver, comprising:
a data receiver for receiving a communications signal from a communications link;
a first circuit for producing a high frequency jitter measurement output proportional to an amount of high frequency jitter of said communications signal, said high frequency jitter measurement output having a component that varies with an amount of low frequency jitter present in said communications signal;
a second circuit for producing a low frequency jitter measurement output proportional to an amount of low frequency jitter of said communications signal; and a correction circuit coupled to said high frequency jitter measurement output and said low frequency jitter measurement output for correcting said high frequency jitter measurement output in conformity with said low frequency jitter measurement output to produce a corrected high frequency jitter measurement output, wherein said correction circuit subtracts a given one of a plurality of predetermined values from said high frequency jitter measurement output to produce said corrected high frequency jitter measurement output, wherein said given values are selected in conformity with a value of said low frequency jitter measurement output.

8. The communications link receiver of claim 7, wherein said correction circuit comprises:
   a selector having inputs coupled to a plurality of constant values corresponding to said plurality of predetermined values and providing said corrected high frequency jitter output;
   a threshold detector having an input coupled to said low frequency jitter measurement output for detecting when said low frequency jitter measurement output has exceeded one or more threshold values, wherein an output of said threshold detector is coupled to a selection input of said selector for selecting a particular one of said plurality of constant values; and
   a subtraction block for subtracting said selected constant value from said high frequency jitter measurement output to produce said corrected high frequency jitter measurement output.

9. The communications link receiver of claim 1, wherein said communications signal is a hardwired high-speed digital communications signal connected to said data receiver.

10. The communications link receiver of claim 1, wherein said communication signal is a wireless communication signal, and wherein said communications link receiver further comprises a wireless signal receiver for receiving said wireless communications signal.

11. A communications link receiver, comprising:
   a data receiver including a clock/data recovery circuit for receiving a communications signal from a communications link;
   a first circuit connected to one or more signals from said clock/data recovery circuit providing indications of edge positions of said communications signal with respect to a reference clock of said clock/data recovery circuit and producing a high frequency jitter measurement output by accumulating said indications of edge positions of said communications signal, said high frequency jitter measurement output having a component that varies with an amount of low frequency jitter present in said communications signal;
   a second circuit connected to one or more signals from said clock/data recovery circuit providing indications of long-term phase variation of said communications signal with respect to a reference clock of said clock/data recovery circuit and producing a low frequency jitter measurement output by accumulating said indications of long-term phase variation; and
   a correction circuit connected to said high frequency jitter measurement output and said low frequency jitter measurement output for correcting said high frequency jitter measurement output in conformity with said low frequency jitter measurement output to produce a corrected high frequency jitter measurement output.

12. The communications link receiver of claim 11, wherein said correction circuit comprises:
   a scaling circuit connected to said low frequency jitter measurement output for scaling said low frequency jitter measurement output; and
   a subtractor connected to an output of said scaler and said high frequency jitter measurement output for subtracting said scaler output from said high frequency jitter measurement output to produce said corrected high frequency jitter measurement output.

13. The communications link receiver of claim 11, wherein said correction circuit comprises:
   a selector having inputs coupled to a plurality of constant values corresponding to said plurality of predetermined values and an providing said corrected high frequency jitter output;
   a threshold detector having an input coupled to said low frequency jitter measurement output for detecting when said low frequency jitter measurement output has exceeded one or more threshold values, wherein an output of said threshold detector is coupled to a selection input of said selector for selecting a particular one of said plurality of constant values; and
   a subtraction block for subtracting said selected constant value from said high frequency jitter measurement output to produce said corrected high frequency jitter measurement output.

* * * * *